United States Patent
Harcourt et al.

(10) Patent No.: US 6,984,351 B2
(45) Date of Patent: Jan. 10, 2006

(54) APPARATUS AND METHOD FOR CONTINUOUSLY AND ENDLESSLY VULCANIZING RUBBER HOSE

(75) Inventors: Robert Harcourt, Erie, PA (US); John Edward Meadowcroft, Waterford, PA (US)

(73) Assignee: Snap-tite Technologies, Inc., Wilmington, DE (US)

(*) Notice: Subject to any disclaimer, the term of this patent is extended or adjusted under 35 U.S.C. 154(b) by 0 days.

(21) Appl. No.: 09/768,024

(22) Filed: Jan. 23, 2001

(65) Prior Publication Data

US 2002/0096251 A1    Jul. 25, 2002

(51) Int. Cl.
    *B28B 11/24* (2006.01)
(52) U.S. Cl. .............. 264/165; 264/176.1; 264/177.17; 156/244.11; 156/244.13; 156/272.2; 156/275.5
(58) Field of Classification Search ........... 156/244.11, 156/244.13, 285, 287, 307.1, 500, 497, 499, 156/156, 272.2, 275.5, 379.6, 380.9; 264/632, 264/634, 635, 512, 514, 515, 516, 564, 565, 264/209.1, 211.12, 347, 176.1, 177.17, 171.26; 138/126, 141, 123; 428/35.7, 35.9, 36.8, 428/36.9, 36.91, 36.92; 250/493.1, 494.1, 250/495.1, 504 R
See application file for complete search history.

(56) References Cited

U.S. PATENT DOCUMENTS

| | | | |
|---|---|---|---|
| 2,483,709 A | 10/1949 | Paulsen | |
| 3,038,523 A * | 6/1962 | Merck et al. | 156/393 |
| 3,627,610 A * | 12/1971 | Guelich et al. | 156/278 |
| 3,690,796 A * | 9/1972 | Borsvold | 425/90 |
| 3,859,408 A * | 1/1975 | Voss et al. | 264/506 |
| 3,904,144 A * | 9/1975 | Gattrugeri | 242/571.2 |
| 3,966,387 A | 6/1976 | Babbin et al. | |
| 3,972,757 A | 8/1976 | Derderian et al. | |
| 4,121,962 A * | 10/1978 | Hopkins | 156/273.3 |
| 4,155,790 A * | 5/1979 | Galloway | 156/149 |
| 4,247,271 A | 1/1981 | Yonekura et al. | |
| 4,326,905 A * | 4/1982 | Tanaka | 156/149 |
| 4,361,455 A * | 11/1982 | Arterburn | 156/149 |
| 4,483,815 A | 11/1984 | Torghele | |
| 4,488,921 A | 12/1984 | Dougherty | |
| 4,490,316 A * | 12/1984 | Satzler | 264/40.7 |
| 4,512,942 A | 4/1985 | Babbin et al. | |
| 4,517,039 A * | 5/1985 | Satzler | 156/149 |
| 4,559,095 A | 12/1985 | Babbin | |
| 4,623,419 A | 11/1986 | Price | |
| 4,702,867 A | 10/1987 | Sejimo et al. | |
| 4,882,101 A | 11/1989 | Ohkita et al. | |
| 5,091,026 A | 2/1992 | Shizuo et al. | |

(Continued)

FOREIGN PATENT DOCUMENTS

DE    1629258    4/1966

(Continued)

*Primary Examiner*—Jessica Rossi
(74) *Attorney, Agent, or Firm*—Woodling, Krost and Rust

(57) ABSTRACT

An apparatus and process for continuously and endlessly vulcanizing a hose is disclosed and claimed. Pressurized air or other gas is intermittently supplied through a woven jacket, a mandrel, a check valve and into the interior of an extruded rubber hose. The hose is sealed as it is pulled over the mandrel. Pinch rollers seal the other end of the hose. One or more non-contact heaters vulcanize the hose from outside-in. Pressurizing the inside of the hose maintains proper diametrical dimensions of the hose.

16 Claims, 15 Drawing Sheets

U.S. PATENT DOCUMENTS

| | | |
|---|---|---|
| 5,453,229 A | 9/1995 | Enomoto |
| 5,525,288 A | 6/1996 | Ninomiya et al. |
| 5,593,527 A | 1/1997 | Schomaker et al. |
| 5,603,357 A | 2/1997 | Schomaker et al. |
| 6,296,054 B1 * | 10/2001 | Kunz et al. ................ 166/187 |

FOREIGN PATENT DOCUMENTS

| | | |
|---|---|---|
| GB | 602992 | 6/1948 |
| GB | 621199 | 4/1949 |
| GB | 922454 | 4/1963 |

* cited by examiner

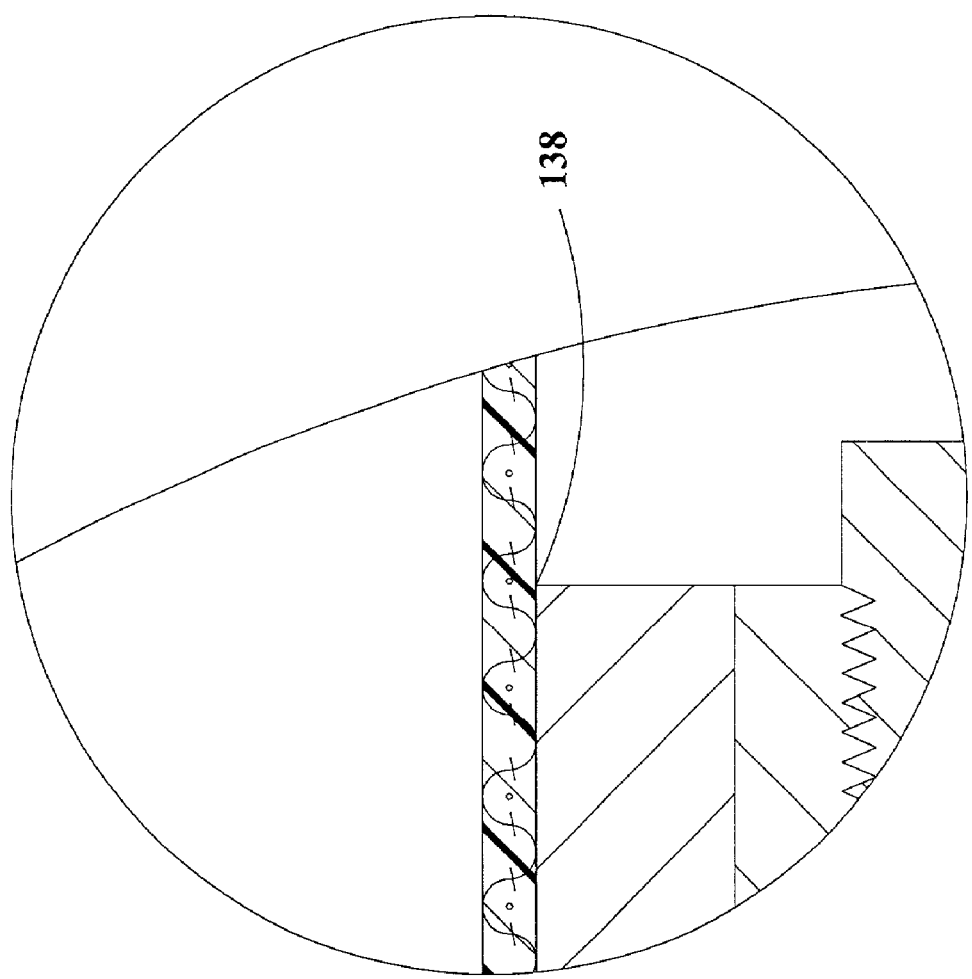

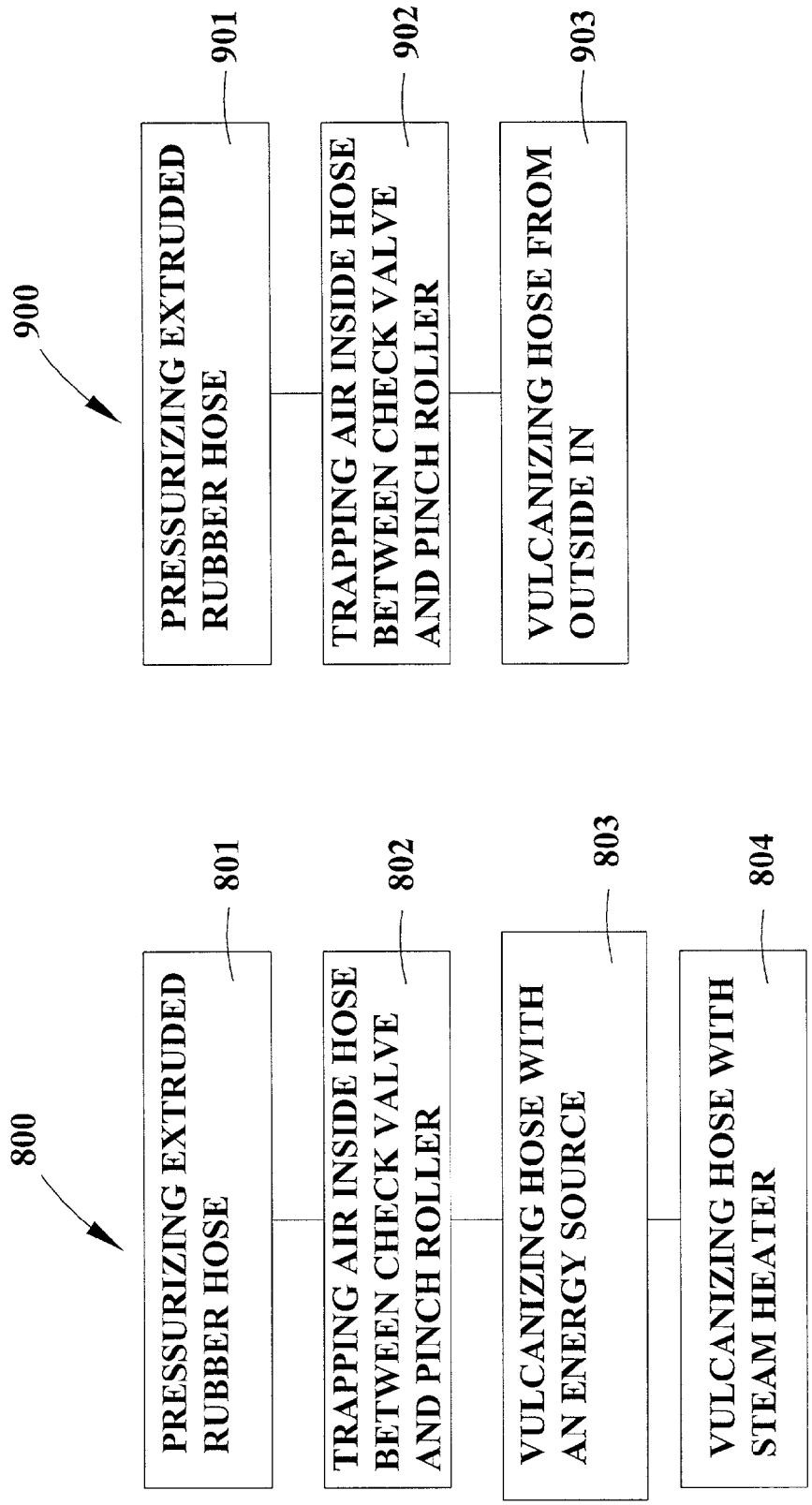

APPARATUS AND METHOD FOR CONTINUOUSLY AND ENDLESSLY VULCANIZING RUBBER HOSE

FIELD OF THE INVENTION

This invention is an apparatus and method for continuously vulcanizing extruded hose. After the elastomeric hose is extruded over a mandrel the hose is pressurized and vulcanized. Vulcanization takes place without contacting the vulcanizing apparatus.

BACKGROUND OF THE INVENTION

Extruded rubber hose is manufactured by different processes. In one such process, extruded rubber hose is manufactured to maximum lengths dictated by the ability to vulcanize the hose. The length of the vulcanizing table determines the length of the hose. Similarly, other vulcanizing devices such as steam autoclaves and hot air ovens limit the length of the hose.

In the past extruded rubber hose was cooled upon exit from an extrusion die. As hose exits the extrusion die it is under the tension of haul off equipment. Unwanted diametrical reduction of the hose occurs due to tension of the haul off equipment. Upon exiting the cooling tank the hose cover is perforated about its circumference many times. The perforations are numerous and very close together.

After the hose cover is perforated as described it is removed from the production line and loaded into a container for transport to a vulcanizing table. Care must be taken in handling the hose because the rubber of the hose may be nicked, scratched or cut easily as it is very soft and pliable in its unvulcanized state. The length of the hose loaded in the containers is limited by the length of the sloped vulcanizing table. Sloping of the vulcanization table is necessary for steam condensate to drain.

When the hose reaches the vulcanizing table it is placed thereon and laid out lengthwise and coupled with fittings whereupon it is pressurized with steam for a period of time. Pressurization of the hose with steam increases the diameter of the elastomeric hose to the desired diameter and cures it. Perforations allow gases to escape from the hose cover during vulcanization.

After the hose is vulcanized it is removed from the vulcanization table and coated with latex to fill the holes. Unfilled holes can accelerate degradation of the woven fabric which acts as the superstructure (reinforcement) of the hose. Rubber hose is often used in corrosive environments where the warp and weft fibers of the woven jacket may degrade if they come in contact with certain chemical compounds.

Another process for manufacturing extruded rubber hose is set forth in U.S. Pat. No. 4,559,095 to Babbin at col. 5, line 21. Babbin indicates that an externally jacketed "tubular article" may be inflated during the vulcanization process to maintain the circular cross-sectional shape of the tubular article. Pressurization takes place while a length of the cut hose is inside the vulcanizing autoclave or oven. A thermoplastic external jacket is extruded about the rubber hose and protects the hose from scrapes, nicks, dents, grooves or the like before or during vulcanization. Conventional pressurizing methods or apparatus may be used during vulcanization. The external jacket is stripped away subsequent to the curing step. Table I of the '095 patent teaches autoclave curing of the rubber at 300° F. for 50 minutes with a 10–15 psi differential pressure. Example 4 teaches placing the hose in a microwave boost for 30 to 180 seconds followed by curing in a hot air oven for 30 to 40 minutes at about 307° F. The '095 patent does not teach continuous manufacture and vulcanization of elastomeric hose under pressure. Nor does the '095 patent teach endless manufacture and vulcanization of elastomeric hose under pressure.

Another process for manufacturing extruded rubber hose is set forth in U.S. Pat. No. 3,966,387 to Babbin et al. which discloses a helical extending vulcanizing chamber with entrance and exit sealing means. The hose assembly as it passes through the apparatus comprises a typical elastomeric hose structure and an internal, removable, flexible support mandrel typically made of solid rubber or plastic. Continuous vulcanization of elastomeric hose free of an outer pressure sheath or covering occurs by means of hot fluid. Hot fluid vulcanizes and transports the hose and contacts the exterior of the hose. See, FIG. 3 of the '387 patent.

Another process for manufacturing extruded rubber hose is set forth in U.S. Pat. No. 4,702,867 to Sejimo which discloses a "method for continuously vulcanizing rubber hose under normal pressure while preventing foaming of the unvulcanized rubber by covering the hose with a thin layer of resin." See, col. 2, lines 5–8 of the '867 patent. The process is not continuous, however, but occurs in two steps. A first step of heating in a microwave vulcanizing tank to a temperature which causes partial vulcanization of the hose followed by placement of the hose in a heated vulcanizing tank until vulcanization of the hose is completed.

SUMMARY OF THE INVENTION

The instant invention is a continuous and endless method for making elastomeric hose. The apparatus for making the hose is also disclosed and claimed. Hose length is theoretically unlimited and is practically limited only by a customer's specification. A non-contact heater is employed to vulcanize the hose as it exits the extruder head. A gas, preferably air or an inert gas, is used to pressurize the inside of the hose as it exits the extruder. Air is supplied through a check valve located in a mandrel and into an extruded rubber hose. As rubber is extruded onto, into and through a woven fabric, a hose is formed as it exits the mandrel and the extruder head (or die as it is sometimes identified herein). The hose, therefore, has an interior coated surface and an exterior or coated surface. A seal is formed as the hose is drawn over the mandrel and through pinch rollers by a haul off or capstan (a series of rollers which flatten the hose). The pinch rollers or capstan seal the hose such that pressurized air is trapped within the hose as it is vulcanized.

An air supply is intermittently supplied through the woven jacket and into a tube connected to the mandrel extension. A lead-in cone may be affixed to the tube which facilitates the smooth feed of the woven jacket onto the tube. The lead-in cone has a convex surface which is the reciprocal of the concave surface of an air supply cup. The tube is clamped to support the mandrel extension and the mandrel within the extruder head. The check valve assembly secures the grille and pin of the mandrel to the mandrel extension. An air supply cup is affixed to a valve which admits air to the cup when it is open. The air supply cup is brought forcibly and intermittently into engagement with the woven jacket creating a seal between the cup and the tube. When the lead-in cone is used a seal is created between the cup, tube and lead-in cone. When sufficiently compressed, the woven jacket acts as a seal. Preferably air is used to pressurize the hose so as to maintain its desired diameter as it exits the non-contact heater but other gases such as the inert gases may be used. Air is less expensive to use but any non-reactive gas may be used which is environmentally compatible. Additionally, it is envisioned that steam may be used in place of the air or inert gas.

The air supply cup may be manually engaged with the tube by a person's hand or it may be engaged mechanically in which case a solenoid operated valve is employed. The frequency of air admission to the tube and, hence, through the check valve is determined by measuring the diameter of the extruded hose as it exits the non-contact vulcanizing heater and comparing the measured diameter to the required (specification) diameter. If the measured diameter is too small compared to the desired diameter, then the frequency of the intermittent supply of air to the tube is increased in order to increase the diameter of the hose. If the measured diameter is too large compared to the desired diameter, then the frequency of the intermittent supply of air to the tube is decreased in order to decrease the diameter of the hose. Additional air may be required if process conditions such as room temperature or heater output changes. Because the heater does not contact the hose, no flat portions or deformities of the hose occur.

Controlling the outside diameter of the hose within specified tolerances results in controlling the inside diameter within specified tolerances. When the outside diameter of the hose is too large or small, the inside diameter of the hose is correspondingly too large or small.

Vulcanizing with a non-contact heater while under pressure substantially eliminates nicks, cuts or scrapes in the hose because the hose never touches the heater. The instant vulcanization process eliminates the need to circumferentially perforate the exterior of the hose to allow gases to escape in the vulcanization performed under the prior art process of pressurizing the hose with steam on the vulcanizing table.

Accordingly, it is an object of the instant invention to control the inside and outside diameter of the elastomeric hose. The diameters are controlled by simultaneously pressurizing the inside of the elastomeric hose and vulcanizing the hose.

It is a farther object of the instant invention to continuously and endlessly vulcanize the elastomeric hose.

It is a further object of the instant invention to pressurize the inside of the elastomeric hose and seal the hose as it is drawn over the mandrel and through pinch rollers by a capstan or haul off.

It is a further object of the instant invention to vulcanize hose from the outside-in with a non-contact heater.

It is a further object of the instant invention to supply a gas through a woven fabric, into a tube, through a check valve and into a rubber hose.

These and other objects will be better understood when taken in conjunction with the Brief Description of the Drawings, Description of the Invention, and Claims which follow hereinbelow.

BRIEF DESCRIPTION OF THE DRAWINGS

FIG. 1C is an enlargement of a portion of FIG. 1B.

FIG. 7 illustrates schematically the pressurization of the hose.
FIGS. 8 and 9 each illustrate process steps of the present invention.

Figure 1:
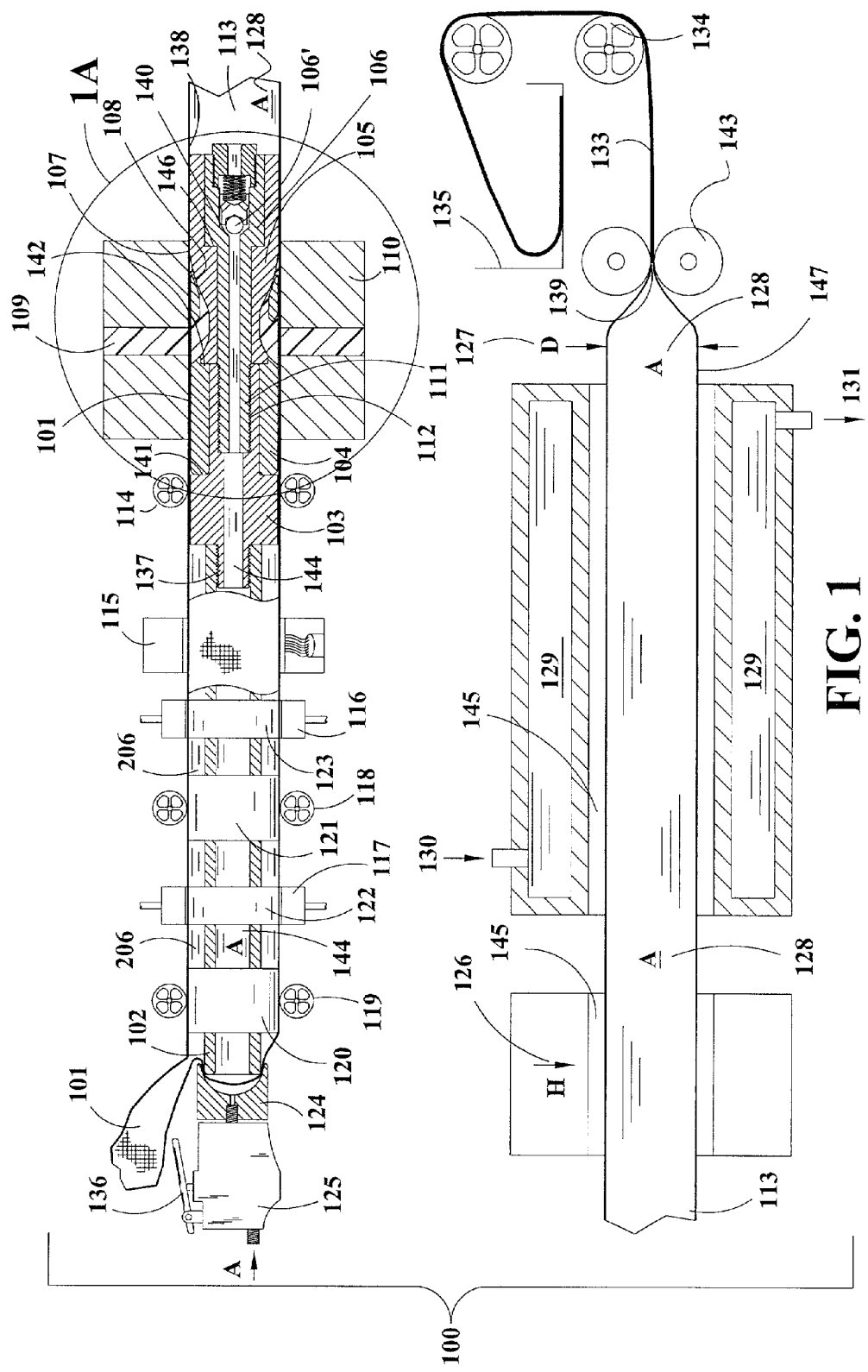
FIG. 1 is a schematic representation of the invention.

A better understanding of the drawing figures will be had when reference is made to the Description of the Invention and Claims which follow hereinbelow.

DESCRIPTION OF THE INVENTION

FIG. 1 illustrates (by reference numeral 100) the invention for continuously and endlessly making an elastomeric hose. Woven superstructure 101 of the hose, sometimes referred to herein as a woven jacket 101, is illustrated in FIG. 1 as being placed over a tube 102. Tube 102 is interconnected to mandrel extension 103 which in turn is interconnected to grille 104 of the mandrel. Reference numeral 137 illustrates a threaded interconnection between mandrel extension 103 and tube 102. The term "mandrel" as used in this invention includes the grille 104 and a pin 105. Check valve assembly 106 is affixed to mandrel extension 103 and secures pin 105 to grille 104. Check valve assembly 106 includes a housing 111 which is threaded 112 into the mandrel extension 103.

Figure 1A:
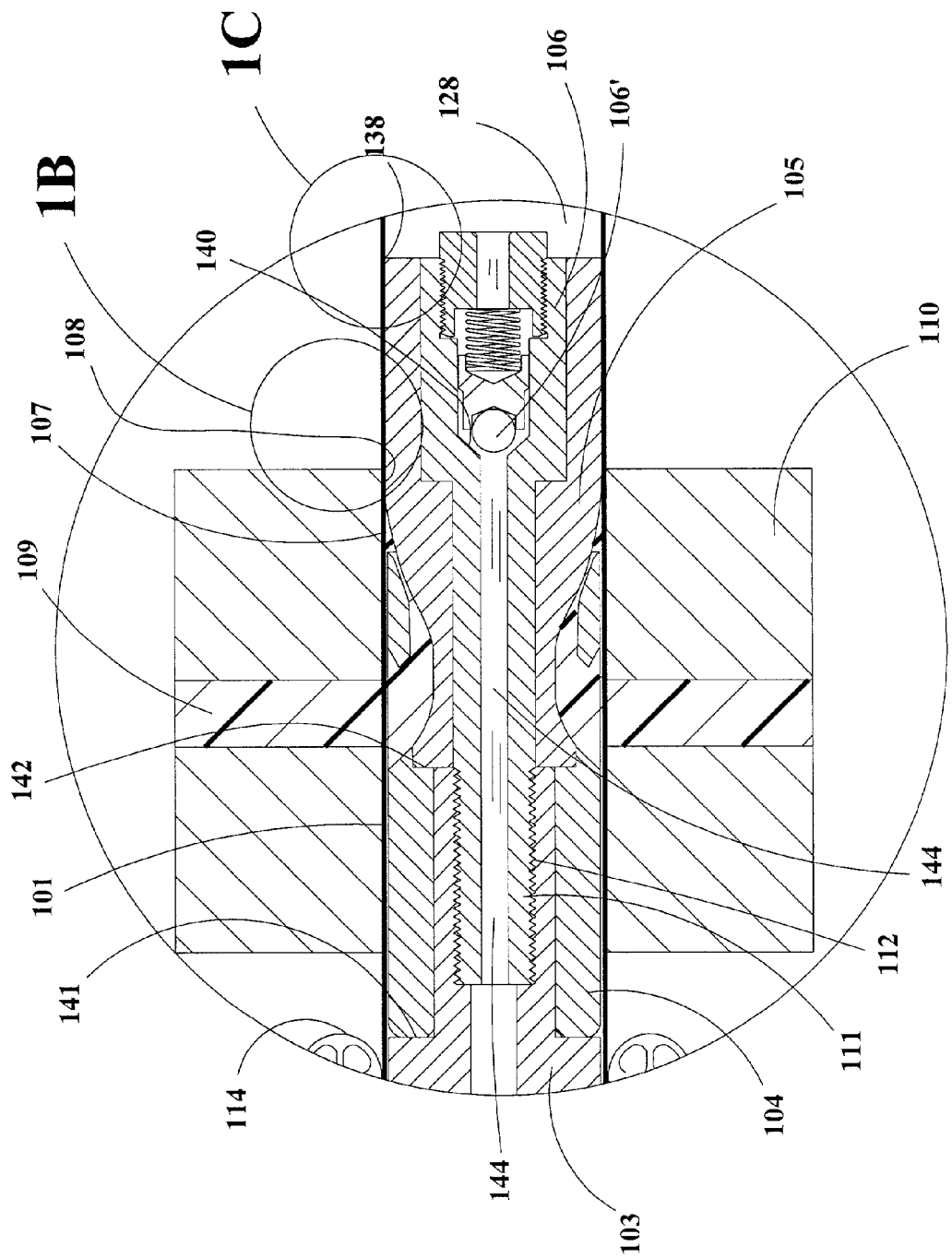
FIG. 1A is an enlargement of a portion of FIG. 1.

FIG. 1A is an enlargement of a portion of FIG. 1 illustrating the check valve assembly 106 threaded 112 into the mandrel extension 103. Engagement of the check valve assembly 106 against pin 105 is illustrated by reference numeral 146. Reference numeral 142 illustrates engagement of pin 105 against grille 104. Reference numeral 141 illustrates engagement of grille 104 with mandrel extension 103. The check valve assembly 106 secures grille 105 and pin 104 to the mandrel extension. Pressurized and melted rubber 109 is illustrated well in FIG. 1A and is shown applied onto, into and through the fabric 101.

Woven jacket 101 has rubber 109 or another elastomer coated onto, into and through it by die/extrusion head 110, grille 104, and pin 105. Melted rubber 109 under pressure is forced through the die/extrusion head 110 and forms an outer coating 107 of rubber on the hose and an inner coating 108 of rubber on the hose. Inner coating 108 of rubber on the hose seals 138 against the pin 105 so as to prevent air escape from the inside of the coated uncured hose 113.

Drive wheels 119 operate to advance the woven fabric 101 over a drive support 120 affixed to tube 102. Drive supports 120 and 121 are sized so as to enable larger diameter fabric 101 which is considerably larger than the diameter of the tube 102 to be processed. Drive wheels 118 further advance the woven fabric between clamps 117 and 116 which operate against clamp supports 122 and 123 affixed to tube 102. Clamp supports 122 and 123 are sized to handle woven fabric larger than the diameter of the tube 102. Drive rollers 114 supply woven fabric 101 to the extrusion die 110 otherwise known as the extruder head 110.

Woven fabric 101 is supplied over the endmost portion of tube 102 as illustrated in FIG. 1. Air supply cup 124 sometimes referred to herein as a gas supply cup 124 is shown in FIG. 1 engaging cloth 101 forcibly against tube 102. Air supply hand held valve 125 supplies air to supply cup 124 when handle 136 is depressed.

Air passageway 144 extends through tube 102, mandrel 103, and check valve 106. As shown in FIG. 1 ball 106' is shown off its seat. Seat 140 of check valve 106 is shown in both FIG. 1 and 1A. In FIG. 1A, seat 140 of the check valve is best viewed. Air or other gas is admitted to the interior of the coated, uncured hose 113 as indicated by reference numeral 128. See, FIG. 1.

Pre-heater 115 is shown diagrammatically in FIG. 1. Optional energy boost 126 is also diagrammatically shown in FIG. 1. Optional energy boost 126 may be a microwave energy source, an infrared energy source, a hot air energy source, or an electric heating coil or coils. A steam heater 129 is shown with steam supply 130 and condensate drain 131 in FIG. 1. An annular gap 145 between steam heater 129 and hose 113 is illustrated. Annular gap 145 is indicative of the fact that the hose 113 does not touch or contact heater 129 or optional heater 126. Letter H in the optional heater 126 simply signifies the addition of heat to the uncured hose 113 to boost the energy level of the uncured hose.

Steam heater 129 is simply a pipe within a pipe with flanges welded on the ends thereof. Saturated steam or superheated steam may be used. Instead of a steam heater, hot air or radiant heat may be used. Intense light may be used as well as microwave radiation or infrared radiation.

The length of steam heater 129 is approximately 50 feet. The length of the steam heater may be longer or shorter as desired by the user based on the elastomer used, size of hose extruded and the extrusion rate. Hose is extruded and cured continuously and endlessly through the non-contact steam heater 129 at a rate of approximately 1200 feet per hour. Curing time within non-contact steam heater is 2.5 minutes using saturated steam. Curing temperatures of the rubber used are between 220° F. and 350° F. Other extrusion rates, curing times, and curing temperatures may be used depending on the length and type of heater, elastomer used and size of the hose. Curing times may vary between 1 to 4 minutes more or less depending upon the diametrical size of the hose, elastomer used, and initial energy state of the hose as it enters the steam heater or other vulcanizing apparatus.

Gap size 145 will vary depending upon the diametrical size of the hose as the same size steam heater 129 may be used regardless of hose size. Those skilled in the art will recognize upon reading this disclosure that heater 129 may be of different length depending upon the extrusion rate being used. As the extrusion rate increases a longer heater may be used and as the extrusion rate decreases a shorter heater may be used. The lengths will vary as well depending on the energy level of the steam.

The hose is cured at the point indicated by reference numeral 127 where the diameter "D" is controlled by air pressure 128 inside the hose in combination with the cure of the hose. Diameter 127 may be measured mechanically such as with calipers, or it may be measured with an optical sensor, or some other automated dimensional sensor.

Pinch rollers 143 pinch and seal the hose so as to prohibit air flow rightwardly past rollers 135 when viewing FIG. 1. Air is trapped between the pinch rollers 143 and the mandrel (check valve and grille) as the hose moves continuously and endlessly through heater 129. Reference numeral 134 is a haul off which routes vulcanized hose in a storage bin 135. The haul off may be a capstan 134 which is a series of rollers which flatten 133 the hose.

Reference numeral 138 illustrates the circumferential air seal between the extruded rubber and edge of pin 105. See, FIGS. 1A and 1C which are enlargements of a portion of FIG. 1 best illustrating the circumferential air seal 138 between the rubber coating on the interior of uncured hose 113 and pin 105. Another seal 139 is illustrated in FIG. 1 at the point where pinch rollers 143 pinch the cured hose 147 and flatten 133 the cured hose. Although seals 138 and 139 have proved to be good seals, gas (air) is lost over time and is replaced by the intermittent application of gas supply cup 124 to tube 102. Gas may occasionally seep past seals 138 or 139 or it may escape along the threaded interconnection of the check valve. Seals could be added to the check valve interfaces if desired.

Figure 1B:
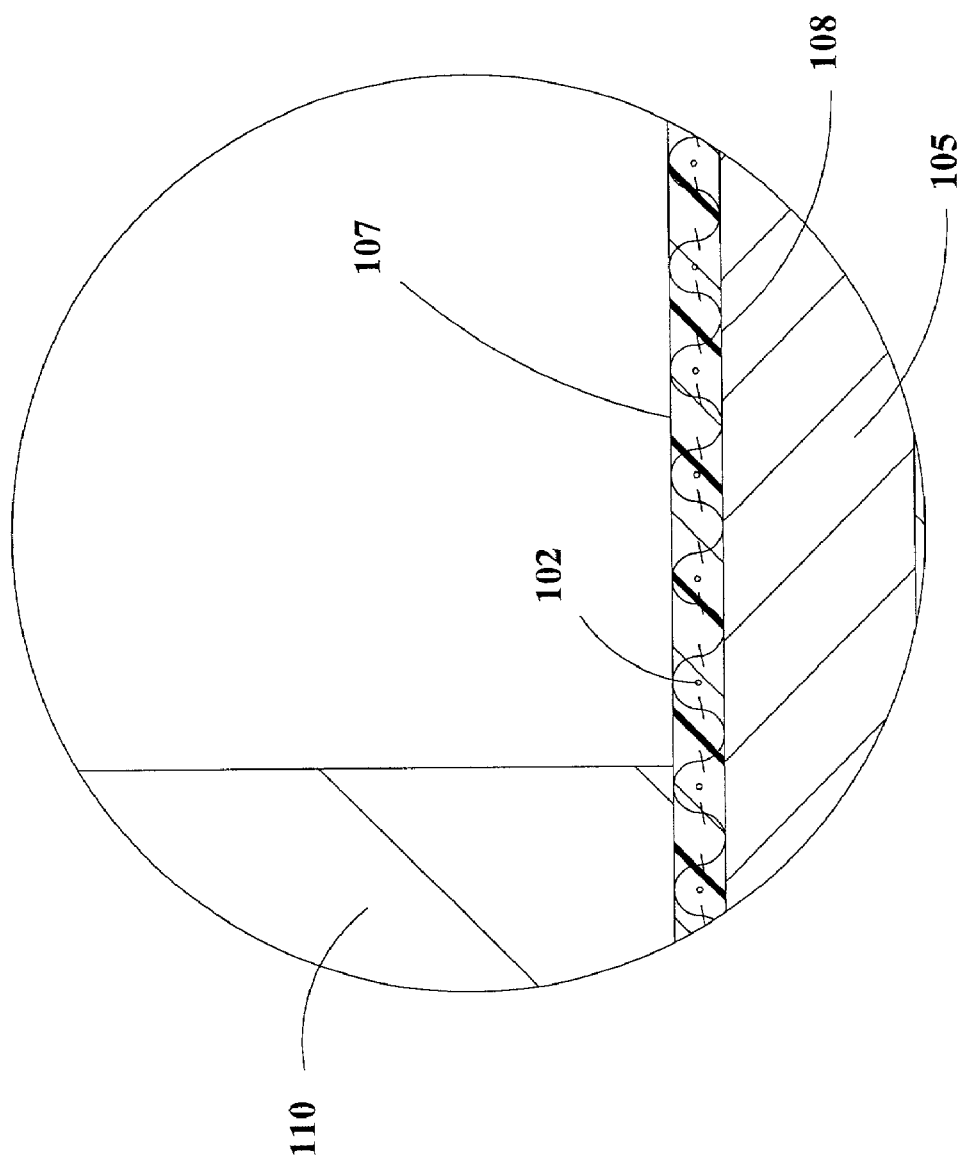
FIG. 1B is an enlargement of a portion of FIG. 1A.

FIG. 1B is an enlargement of a portion of FIG. 1A and illustrates the exterior 107 and interior coat 108 of rubber 109 on fabric 102. FIG. 1C is an enlargement of a portion of FIG. 1B. FIG. 1C illustrates the seal 138 which is effected between the inner coating 108 of rubber on fabric 102 against the mandrel. Pin 105 is sealed against the coated but uncured hose 113 as it is drawn through the pinch rollers by the haul off. In this way an airtight seal is formed between the uncured hose and pin 105.

Figure 2:
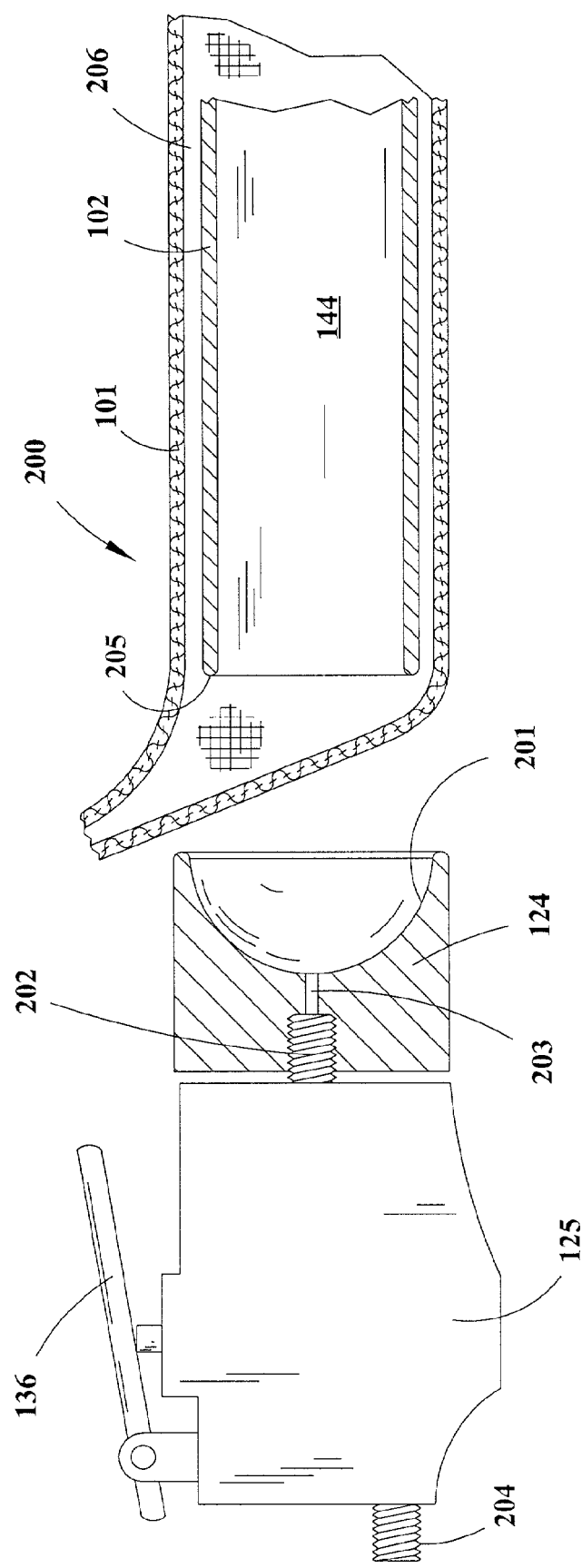
FIG. 2 is a partial cross-sectional view of an embodiment of a bowl-shaped air cup and a tube covered with woven cloth.
Figure 3:
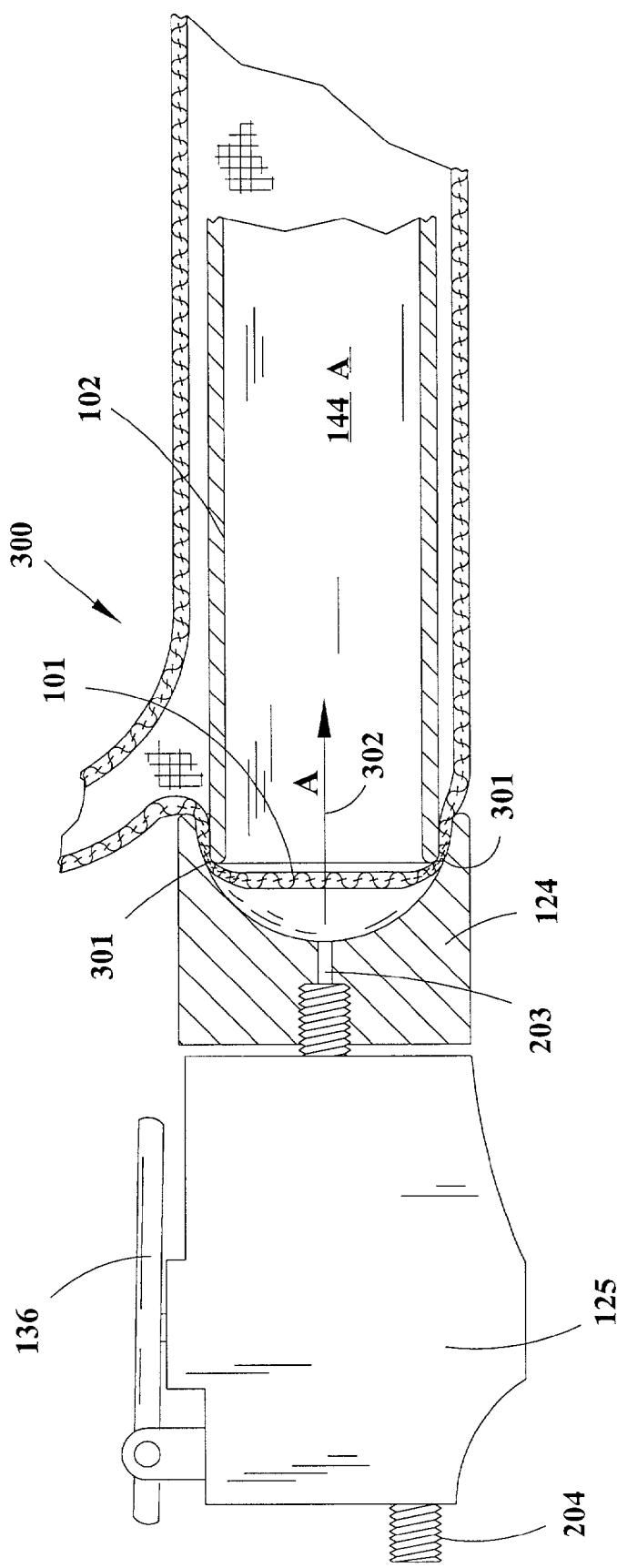
FIG. 3 is a partial cross-sectional view similar to that shown in FIG. 2 with the cup shown sealingly engaging the woven cloth and supplying air therethrough.

FIG. 2 is a partial cross-sectional view of an embodiment of the bowl shaped air supply cup 124 and tube 102 covered with woven cloth 101. Gap 206 as shown in FIG. 2 is relatively small as compared with gap 206 as shown in FIG. 1 because FIG. 1 shows the adaptation of the process to accommodate large size woven jackets 101. Vulcanized rubber hose 147 can be made by the process as described herein within the range of ¾" outside diameter to 6" outside diameter. In FIG. 2, handle 136 of valve 125 is shown undepressed because cup 124 does not engage tube 102. Depression of handle 136 opens valve 125. Reference numeral 200 illustrates the approach of cup 124 toward woven fabric 101 and the tube 102. Spherically shaped bowl 201 is interconnected with air or gas duct 203. Threaded stud interconnection 202 (shown in elevation) has a passageway therethrough and interconnects valve 125 and cup 124. Air supply line 204 supplies air to valve 125. Tube 102 is illustrated as having rounded edges 205 which effect sealing of cup 124 when it engages the fabric 101 and is pressed up against the tube 102 as illustrated in FIG. 3. Further, rounded edges 205 facilitate feeding of fabric 101 over and onto tube 102.

Figure 2A:
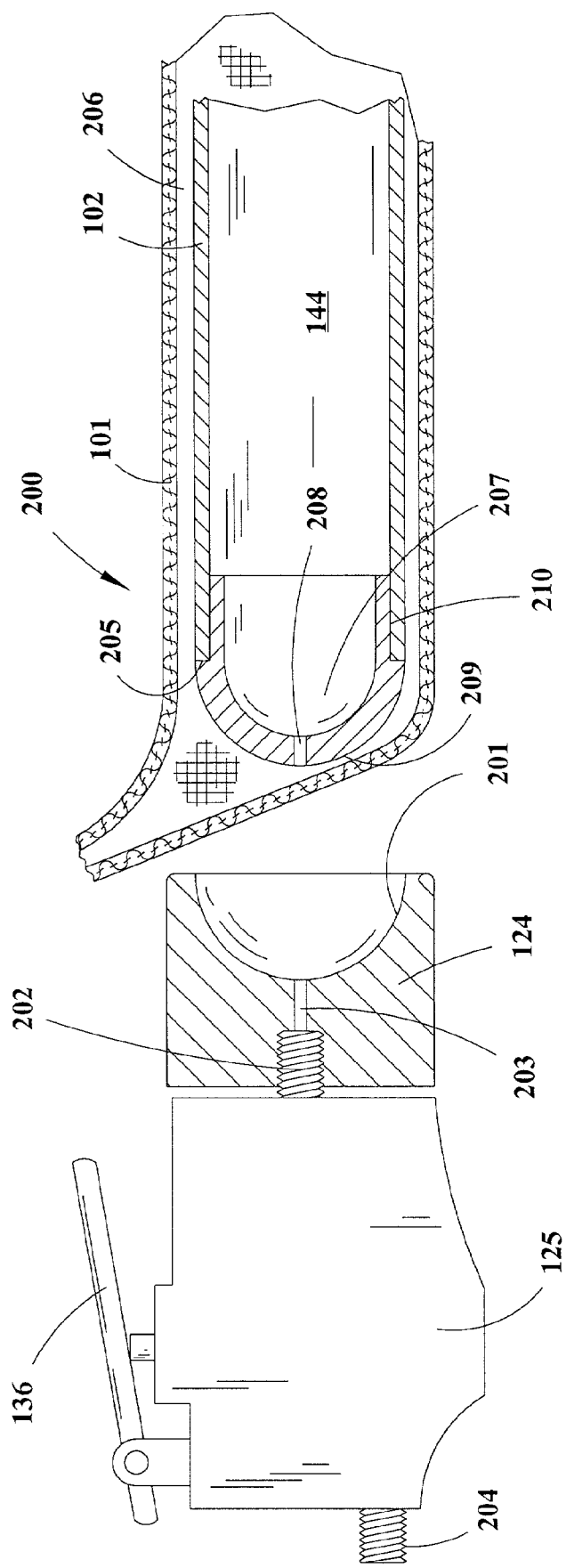
FIG. 2A is a partial cross-sectional view illustrating use of a lead-in cone affixed to the tube.

FIG. 2A is a partial cross-sectional view illustrating use of a lead-in cone 207 affixed to the tube 102. Cone 207 is press fit 310 into tube 102. Cone 207 includes a convex shaped portion 209 which is the reciprocal of concave shaped portion 201 of cup 124. Air passageway 208 in cone 207 allows passage of air to tube 102. Cone 207 may be used in the invention as depicted in FIG. 1. Cone 207 functions to aid the feed of woven fabric 101 over and onto tube 102. Because of its spherical shape the woven fabric slides readily thereover.

FIG. 3 is a partial cross-sectional view similar to that shown in FIG. 2 with cup 124 shown sealingly engaging 301 woven cloth 101 and supplying air 302 through woven cloth 101. Reference numeral 300 indicates engagement of cup 124 with tube 102 while air is being supplied with handle 136 depressed. Reference numeral 302 is an arrow indicating that air is supplied through fabric 101. Reference numeral 301 indicates a circumferential seal effected by the compression of woven fabric 101 against the cup 124 and tube 102. Air is supplied through the fabric only when the fabric is stationary, i.e., when drive wheels 119 are not driving the fabric. See, FIG. 1. As leakage rates at seals 138, 139 are low and as leakage rates between the metal to metal seals are similarly low, the air supply requirements for the adequate pressurization of the hose are low. Air pressures of 5 to 10 psig are typically used within the hose as indicated by reference numeral 128. Other air pressures may be used without departing from the spirit and scope of the appended claims.

Figure 3A:
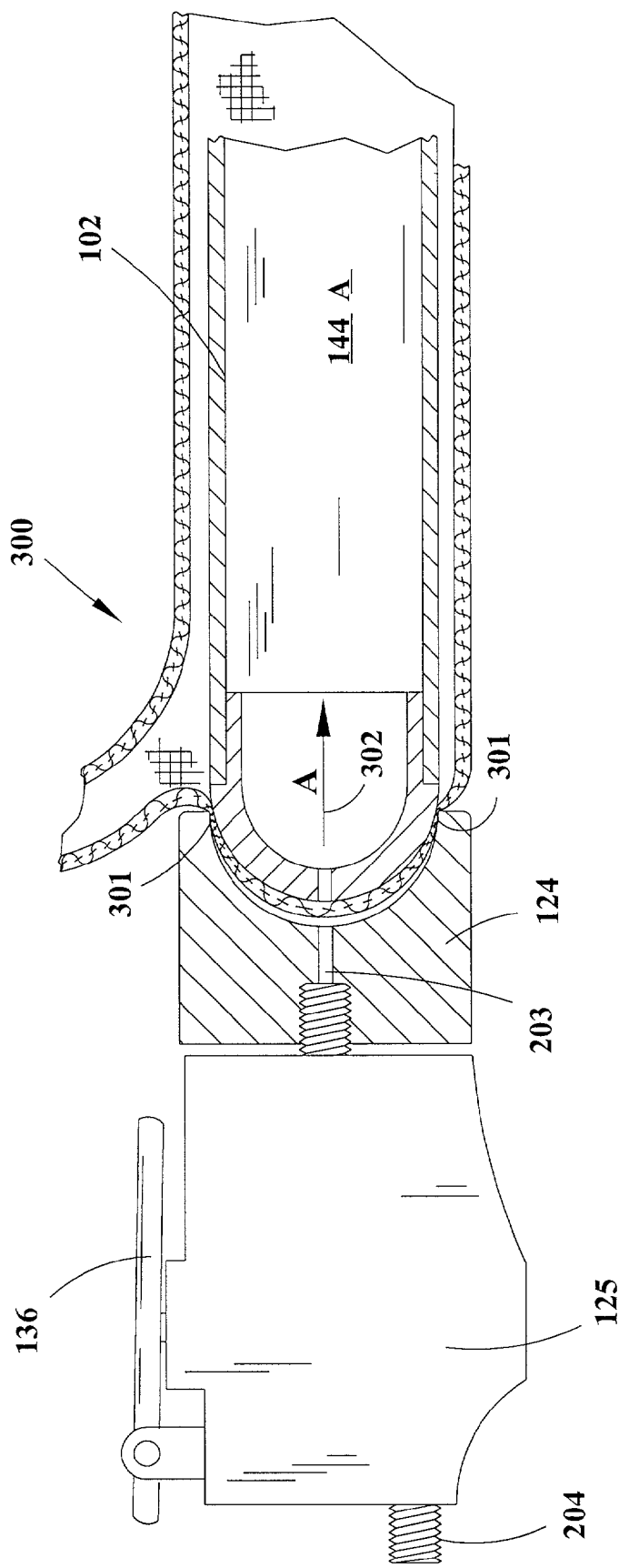
FIG. 3A is a partial cross-sectional view illustrating use of a lead-in cone affixed to the tube with the cup sealingly engaging the woven cloth supplying air through the woven fabric, the cup, the cone and into the tube.

FIG. 3A is a partial cross-sectional view illustrating use of a lead-in cone affixed to tube 102 with cup 124 sealingly engaging 301 the woven cloth 101 supplying air through a woven fabric 101, cup 124, cone 207 and into tube 102. Air or other gas is shown passing through passageways 203 and 208 and into tube 102.

Figure 4:
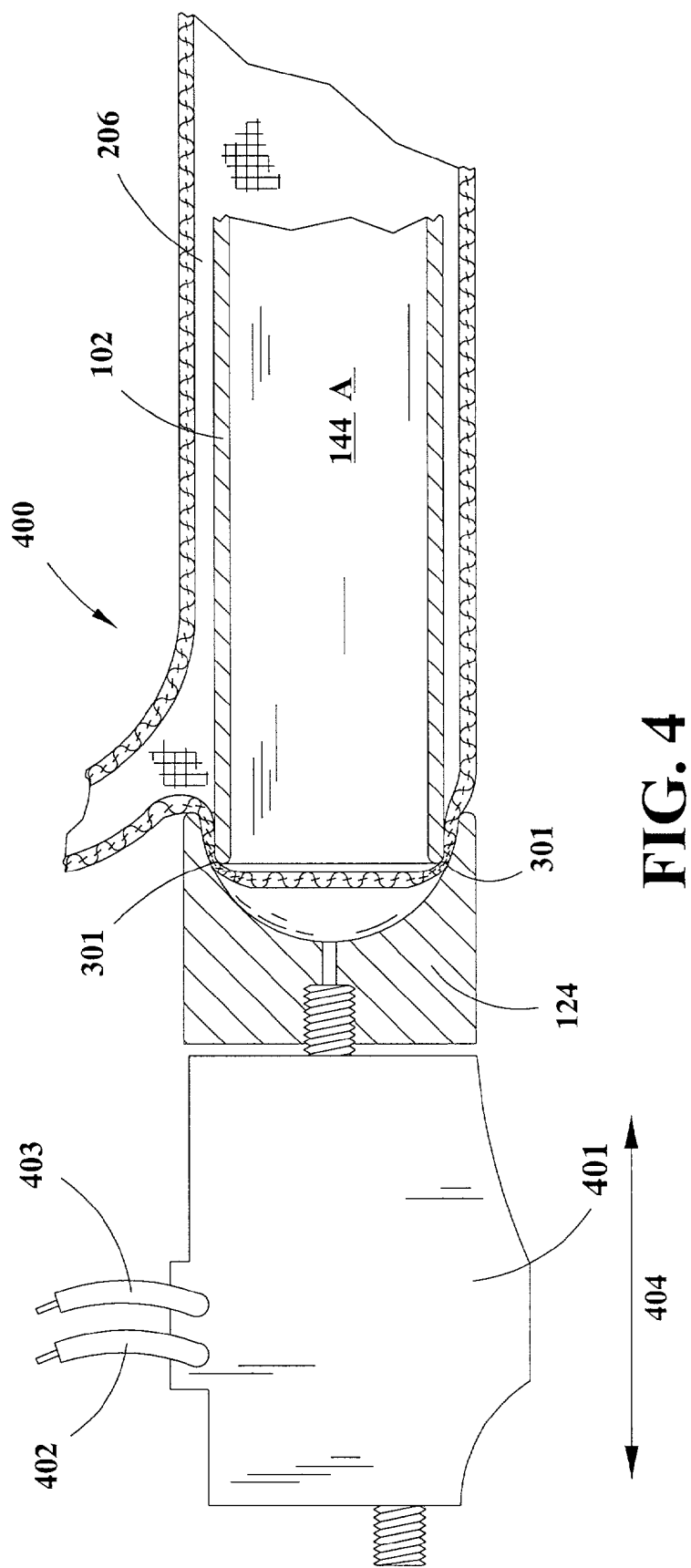
FIG. 4 is a partial cross-sectional view similar to that shown in FIG. 3 except that an electrically operated valve controls the flow of air or other gas through a bowl-shaped cup.

FIG. 4 is a partial cross-sectional view similar to that shown in FIG. 3 except that an electrically operated valve 401 (solenoid operated valve) controls the flow of air or other gas through the bowl shaped cup 124. Electrical leads 402, 403 supply power to operate the solenoid valve. Those skilled in the art will readily recognize that another mechanism could engage the solenoid operated valve 401 and cup 124 on an intermittent basis with the tube 102. Reference numeral 400 represents the scheme of supplying air by the solenoid operated valve 401. Reference numeral 404 indicates reciprocal (back and forth) movement of cup 124 alternately engaging and disengaging cloth 301.

Figure 5:
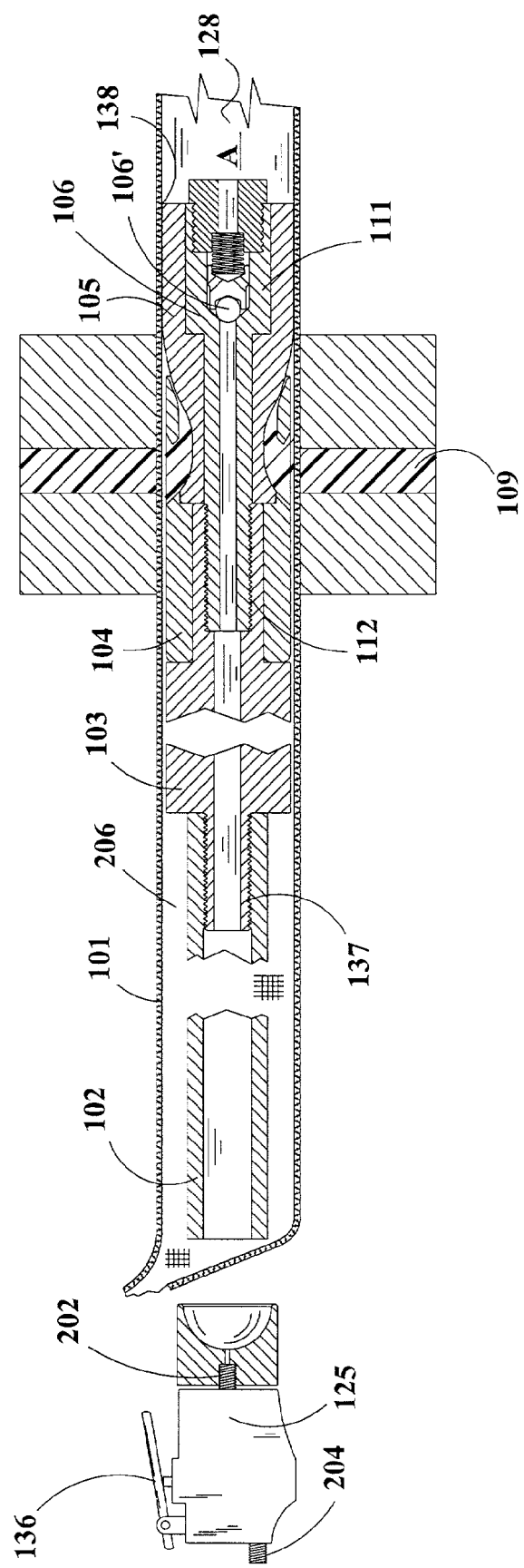
FIG. 5 is a partial cross-sectional view illustrating the bowl shaped air supply cup spaced apart from the woven fabric. The tube, a mandrel extension, grille, pin and check valve are also illustrated in FIG. 5. The rubber extrusion die is also illustrated supplying rubber onto, into and through the woven fabric forming a rubber hose sealingly and slidingly engaging the grille.

FIG. 5 is a partial cross-sectional view illustrating the bowl shaped air supply cup 124 spaced apart from the woven fabric 101. The tube 102, a mandrel extension 103, grille 104, pin 105, and check valve 106 are also illustrated in FIG. 5. The rubber extrusion die 110 is also illustrated supplying rubber 109 onto, into and through the woven fabric 101 forming an uncured rubber hose 113. The rubber hose 113 slidingly and sealingly 138 engages pin 105 as it is pulled rightwardly by the haul off when viewing FIG. 5. Reference numeral 500 is a schematic representation of the air supply not engaged with air trapped in the coated hose. In FIG. 5, ball 106' is seated against seat 140.

Figure 6:
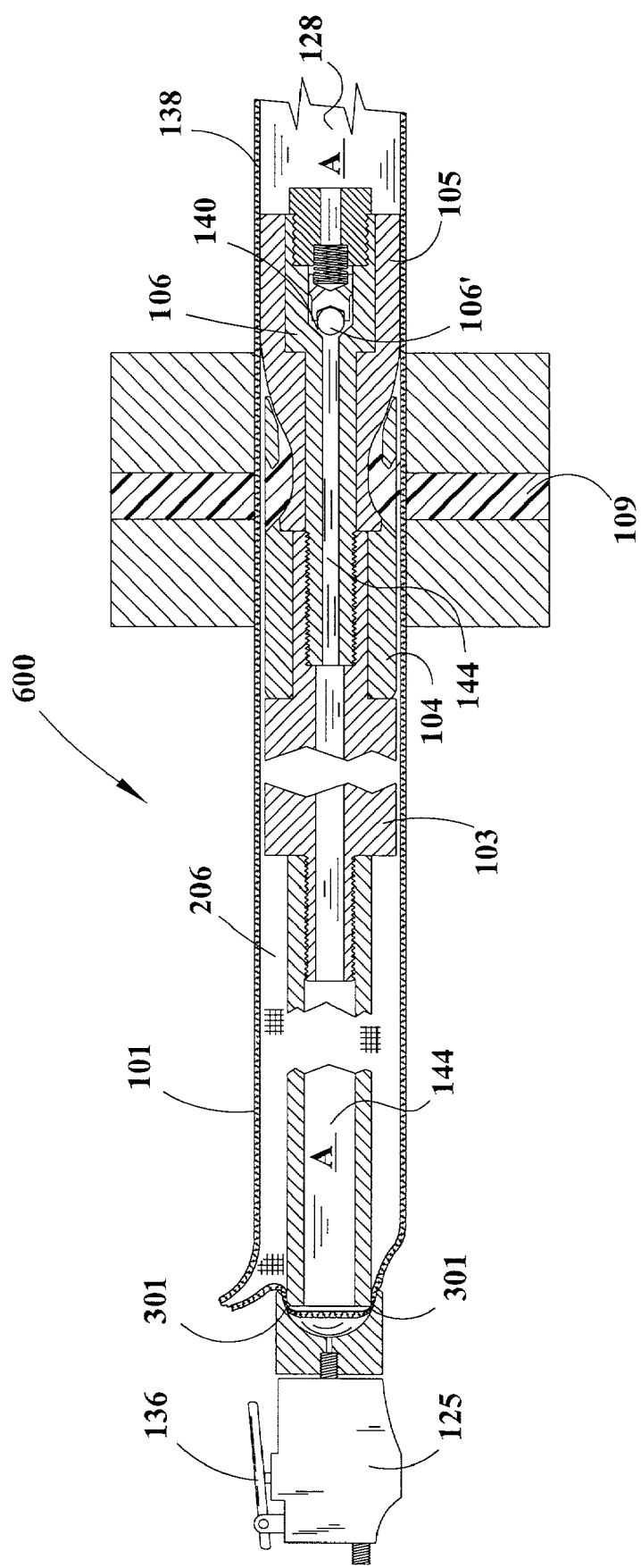
FIG. 6 is a partial cross-sectional view similar to FIG. 5 illustrating air being supplied through the air passageway in the tube, mandrel extension, mandrel and the check valve.

FIG. 6 is a partial cross-sectional view similar to FIG. 5 illustrating air or other gas supplied to the air passageway 144 in tube 102, mandrel extension 103, mandrel 104/105 and check valve 106. Reference numeral 600 is the schematic representation of the air supply engaged with the ball 106' of the check valve off of its seat.

Figure 7:
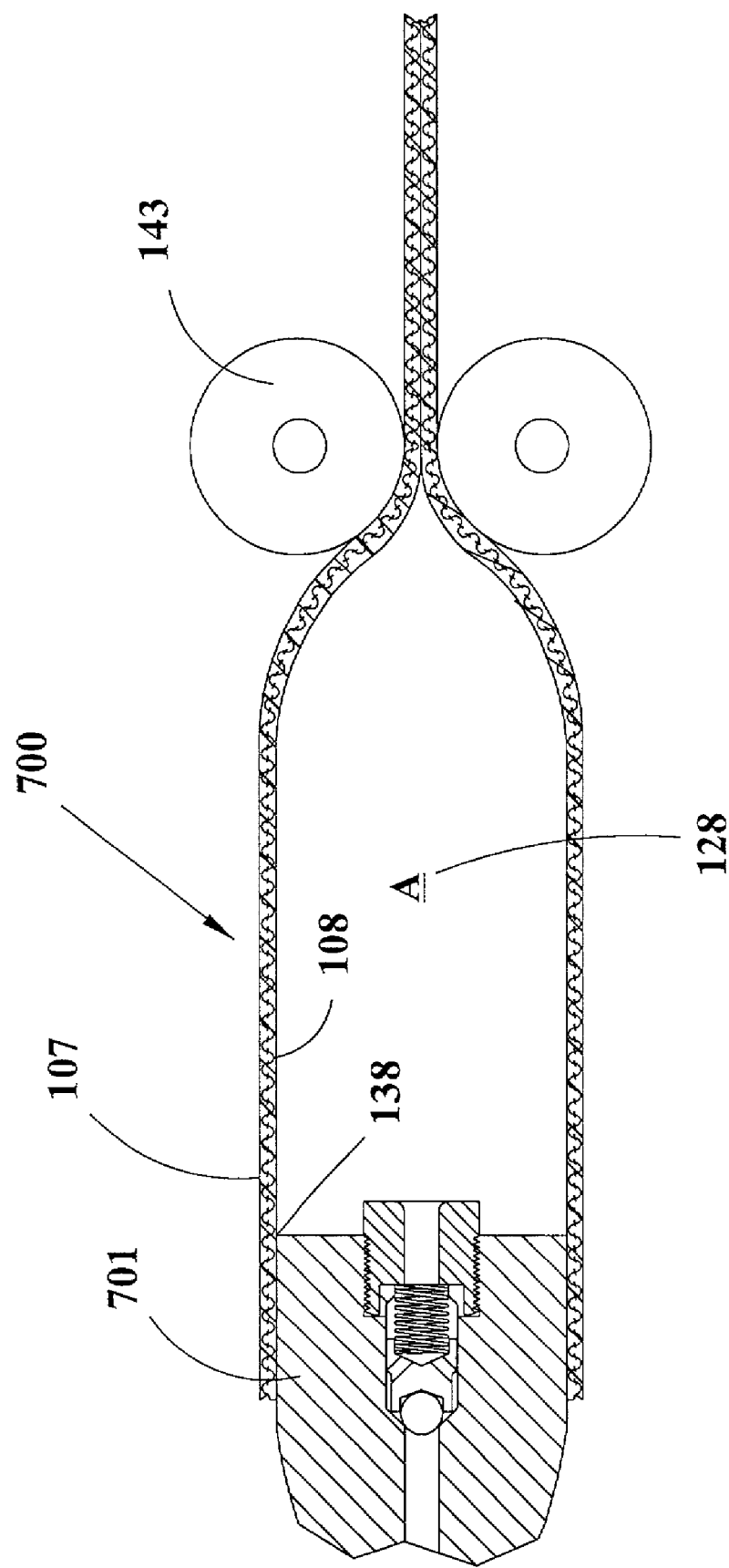
FIG. 7 is a cross-sectional illustration of the check valve in the pin.

FIG. 7 is a cross-sectional illustration of another embodiment where the check valve is in pin 105. FIG. 7 further illustrates schematically the pressurization 128 of the hose. Reference numeral 700 signifies the diagrammatic representation of air entrapment and reference numeral 701 is an embodiment of the pin with the check valve shown as being a part thereof.

FIGS. 8 and 9 each illustrate the process of the present invention. Reference numeral 800 signifies the process steps of the instant invention. The steps are: pressurizing extruded hose 801; trapping air inside the hose between the check valve 106, pin 105 and pinch roller 143; vulcanizing 803 the hose with an energy source; and vulcanizing 804 the hose with a steam heater.

Reference numeral 900 signifies the process steps of the invention without the initial energy boost/vulcanization step 803. The instant invention comprises the steps of pressurizing 901 an extruded rubber hose; trapping 902 air inside the hose between the check valve 106; pin 105 and pinch roller 143; and, vulcanizing 903 the hose from the outside-in. By vulcanizing from the outside-in it is meant that energy is supplied to the outside of the hose and travels toward the inside of the hose. This vulcanization process has been found to yield a hose having a smooth exterior and interior. The process produces interior and exterior diameters within required specifications without the formation of gas bubbles during vulcanization. This method produces a hose with diametrical dimensions (both inside diameter and outside diameter) that are within specifications. The hose that results from this process has a correct diameter and this method overcomes diametrical reduction due to the tension of the haul off device. The haul off device can be capstan rollers. Capstan rollers are essentially a series of rollers whereby the hose is continuously pulled around wheels or rollers organized in an S-shaped configuration such that little or no air can escape the hose because it is in a flattened state.

Figure 10:
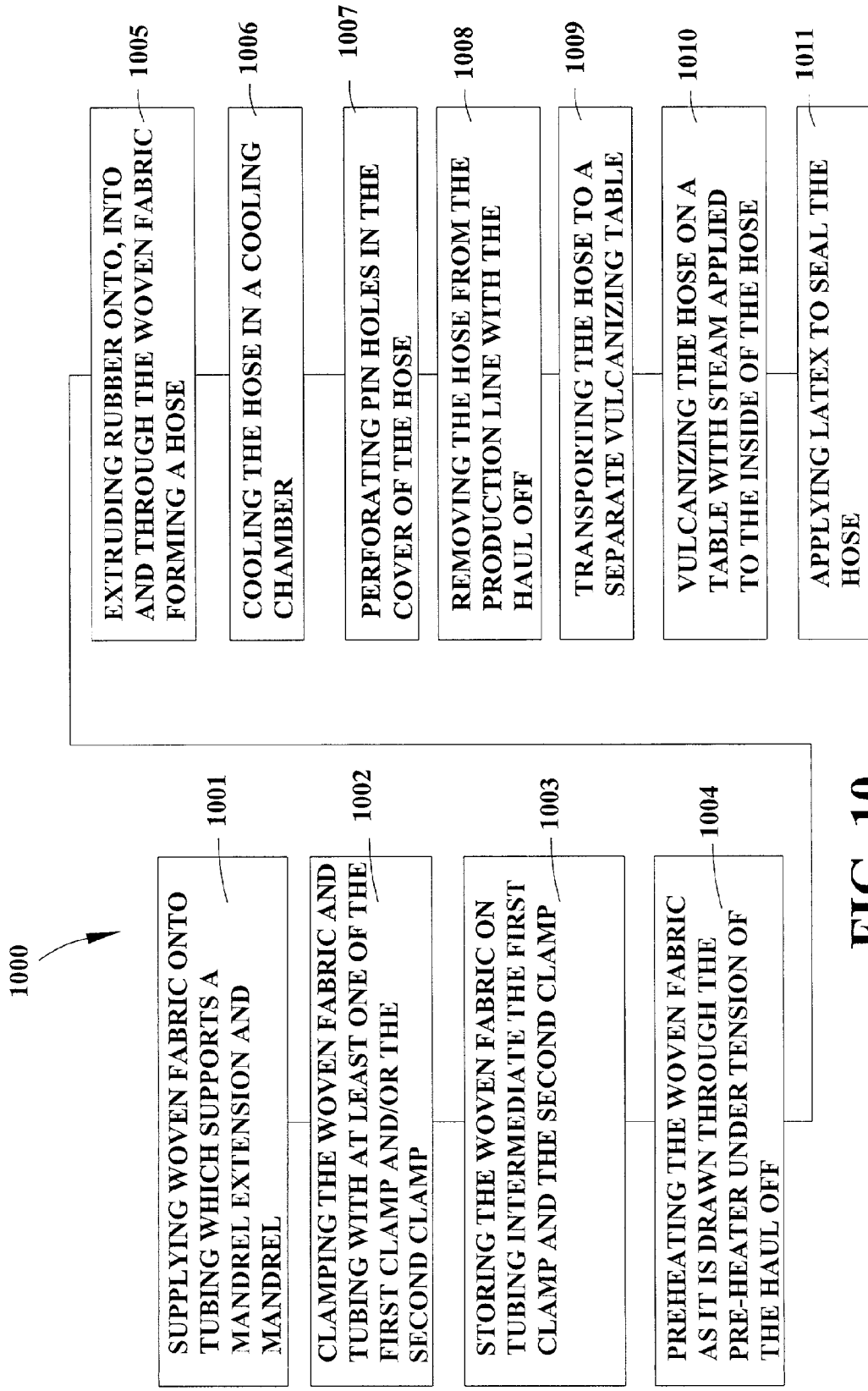
FIG. 10 illustrates process steps of the prior art.
Figure 11:
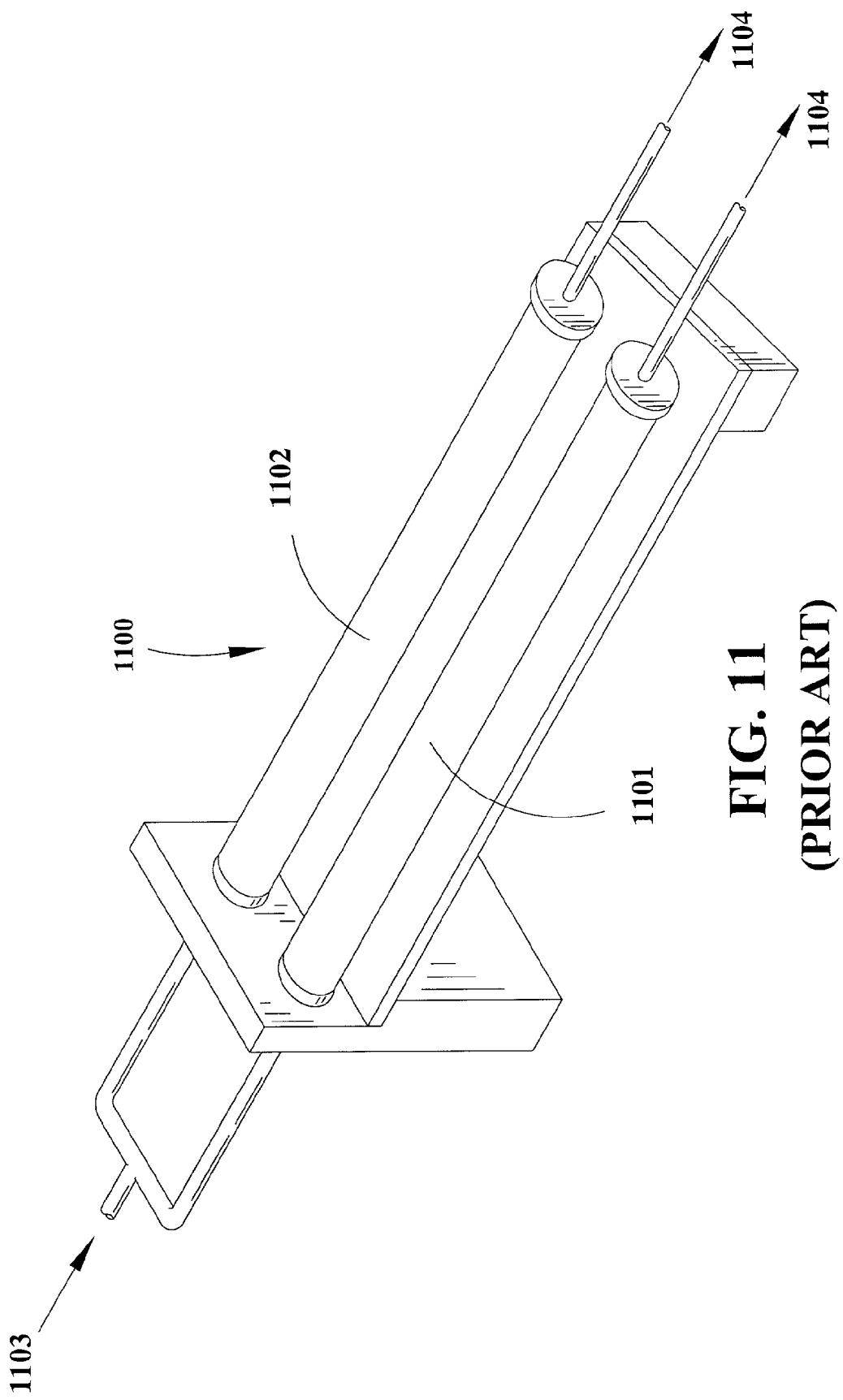
FIG. 11 illustrates the prior art vulcanizing table and hose being vulcanized thereon.

FIG. 10 illustrates the process steps of one of the prior art processes. FIG. 11 illustrates the prior art vulcanizing table and hose being vulcanized thereon. Reference numeral 1000 in FIG. 10 signifies the prior art process. The prior art process comprises the steps of supplying 1001 woven fabric onto tubing which supports a mandrel extension and mandrel; clamping 1002 the woven fabric and tubing with at least one of the first clamp or the second clamp; storing 1003 the woven fabric on the tubing intermediate the first clamp and the second clamp; preheating 1004 the woven fabric as it is drawn through the pre-heater under tension of the haul off; extruding 1005 rubber onto, into and through the woven fabric forming a hose; cooling 1006 the hose in a cooling chamber; perforating 1007 holes in the cover of the hose; and, removing 1008 the hose from the production line with the haul off. The process then continues but it must be emphasized that the process necessitates moving or transporting 1009 the hose to a separate vulcanizing table. Transportation is time consuming and it is easy to scrape or scar the uncured hose. When the hose reaches the vulcanizing table it must be laid out along the length of the vulcanizing table. Additional steps, namely, vulcanizing 1010 the hose on a table with steam applied to the inside of the hose followed by applying 1011 latex to seal the holes in the hose are required. It is necessary to seal the perforations so as to prevent degradation of the unprotected woven jacket reinforcement. During handling and transportation dust or dirt may find its way into the perforated holes in the cover of the hose thus rendering the latex seal somewhat ineffective. The latex seal is somewhat ineffective if dirt resides in the perforations prior to the application of latex.

FIG. 11 illustrates the vulcanizing table with the steam input 1103 which is valved off (but not shown) and the steam outlets 1104 (which are valved off and are not shown). Table 1101 is sloped so that condensation may drain downwardly. The hose 1102 is limited in length by this prior art process according to the length of the vulcanizing table 1101. Reference numeral 1100 signifies this step of the prior art process. Overall, this prior art process includes three steps: (1) a first manufacturing step where the uncured hose is created; (2) a second step where the hose is then cured; and, finally (3) a step where the hose 1102 is in effect repaired so as to fill the holes that were inserted by the punctures. This prior art process heats (cures) the hose from the inside-out and it has been found that in this prior art process bubbles form unless these pin holes are inserted in the hose allowing gasses to escape.

The invention has been described and set forth herein with specificity. Many changes and modifications may be made to the invention without departing from the spirit and scope of the invention as defined by the claims which follow hereinbelow.

I claim:

1. A process for continuously vulcanizing hose comprising the steps of:
   pressurizing said hose by intermittently supplying gas under pressure through a check valve located in a mandrel; and,
   vulcanizing said hose from outside-in using a non-contact heater.

2. A process for continuously vulcanizing hose as claimed in claim 1 wherein said step of pressurizing said hose includes sealing said hose about said mandrel and between pinch rollers.

3. A process for continuously vulcanizing hose as claimed in claim 1 wherein said step of vulcanizing said hose from outside-in is performed by a heater selected from the group of a steam heater, an electric coil, a radiant heater, a microwave heater, and; an infrared heater.

4. A process for continuously vulcanizing hose as claimed in claim 1 further comprising the step of controlling the diameter of said hose.

5. A process for making hose comprising the steps of:
   pressurizing an extruded rubber hose by intermittently supplying air to and through a check valve in a mandrel and into a cavity formed by said check valve, said mandrel, said hose and pinch rollers;
   trapping air inside said hose; and,
   vulcanizing said hose from the outside to the inside using a non-contact heater.

6. A process for making extruded rubber hose comprising the steps of:
   extruding rubber hose over a mandrel such that said rubber hose forms a seal as said hose exits said mandrel;
   tensioning and sealing said rubber hose as it is drawn through pinch rollers by a haul-off; and,
   vulcanizing, utilizing a non-contact steam tube, said hose intermediate said mandrel and said pinch rollers.

7. A process for making an extruded rubber hose as claimed in claim 6 wherein said vulcanization occurs at a temperature of between 220° F.–350° F.

8. A process for making hose comprising the steps of:
   extruding rubber onto, into and through a woven fabric forming an unvulcanized rubber base having an inside and an outside;
   pressurizing said unvulcanized rubber hose with a gas by intermittently supplying gas under pressure Through a gas supply cup to said inside of said rubber hose;
   sealing said inside of said rubber hose with respect to a mandrel;
   pulling the unvulcanized rubber hose through a non-contact heater vulcanizing said rubber hose; and,
   pinching and sealing said vulcanized hose as it is removed from said beater.

9. A process for making hose as claimed in claim 8 wherein the step of pressurizing said unvulcanized rubber hose includes intermittently supplying gas under pressure through a said gas supply cup, into and through a tube interconnected with said mandrel, and into and through a check valve and into said inside of said rubber hose.

10. A process for making hose as claimed in claim 9 further comprising the step of measuring the outside diameter of the vulcanized rubber hose and varying the frequency of said intermittent supply of gas to said inside of said rubber hose in response to said measurement of outside diameter of said hose.

11. A process for making hose comprising the steps of:
    feeding woven cloth over a tube and a mandrel, said woven cloth includes an exterior surface and an inferior surface;
    supplying gas through said woven cloth, from said exterior surface of said woven cloth to said interior surface of said woven cloth into said tube, and through said mandrel;
    extruding rubber onto, into and through said woven cloth forming an unvulcanized rubber hose;
    pressurizing said unvulcanized rubber hose with said gas substantially perpendicularly to said exterior surface of said woven cloth such that said gas passes;
    sealing the inside of said hose with respect to said mandrel;
    pulling said unvulcanized rubber hose through a heater vulcanizing said rubber hose; and,
    sealing said rubber hose as it is removed from said heater.

12. A process for making hose as claimed in claim 11 further comprising the step of measuring the outside diameter of said hose upon exit from said heater.

13. A process for making hose as claimed in claim 12 wherein a check valve is included in said mandrel and pinch rollers seal said unvulcanized hose as it is removed from said heater.

14. A process as claimed in claim 12 wherein said heater may be selected from the group consisting of a steam heater, an electric coil, a radiant heater, a microwave heater, an infrared heater, an electric coil, and a hot air heater.

15. A process for making hose as claimed in claim 12 wherein said step of supplying gas through said woven cloth and into said tube is performed intermittently at a frequency necessary to insure the correct diametrical dimensions of said hose.

16. A process for making hose as claimed in claim 15 wherein said frequency of supplying air through said woven jacket is increased when said outside diameter is too small and said frequency of supply air is decreased when said outside diameter is too large.

* * * * *

UNITED STATES PATENT AND TRADEMARK OFFICE
CERTIFICATE OF CORRECTION

PATENT NO. : 6,984,351 B2
DATED : January 10, 2006
INVENTOR(S) : Harcourt et al.

It is certified that error appears in the above-identified patent and that said Letters Patent is hereby corrected as shown below:

Column 3,
Line 41, after "a" delete "farther" and insert -- further --.

Column 9,
Line 29, after "and" delete ";".
Line 52, after the first occurrence of "F" delete ".".
Line 55, after "rubber" delete "base" and insert -- hose --.
Line 58, after "pressure" delete "Through" and insert -- through --.

Column 10,
Line 6, after "said" delete "beater" and insert -- heater --.
Line 10, after the first occurrence of "through" delete "a".

Signed and Sealed this

Eighteenth Day of April, 2006

JON W. DUDAS
*Director of the United States Patent and Trademark Office*